United States Patent
Noble

(10) Patent No.: US 7,366,897 B2
(45) Date of Patent: Apr. 29, 2008

(54) METHOD AND SYSTEM FOR COMMUNICATION VIA A COMPUTER NETWORK

(75) Inventor: Gary Paul Noble, Nr Broadway (GB)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 10/085,294

(22) Filed: Feb. 28, 2002

(65) Prior Publication Data

US 2003/0061484 A1    Mar. 27, 2003

(30) Foreign Application Priority Data

Sep. 27, 2001    (GB) ................................ 0123213.1

(51) Int. Cl.
*H04L 9/00*    (2006.01)
(52) U.S. Cl. ...................... 713/156; 713/168; 713/169; 713/171; 713/175; 726/3; 380/285
(58) Field of Classification Search ................. 705/74, 705/76; 380/268, 286, 284, 285, 30; 713/155, 713/156, 169, 170, 184, 180, 163, 168, 171, 713/175, 183; 726/4, 17, 5, 28, 3, 15
See application file for complete search history.

(56) References Cited

U.S. PATENT DOCUMENTS

| | | | | |
|---|---|---|---|---|
| 5,815,665 A | * | 9/1998 | Teper et al. ................. | 709/229 |
| 5,870,473 A | * | 2/1999 | Boesch et al. ................ | 705/78 |
| 5,963,915 A | * | 10/1999 | Kirsch ......................... | 705/26 |
| 6,055,504 A | | 4/2000 | Chou et al. ................... | 705/1 |
| 6,473,508 B1 | * | 10/2002 | Young et al. ................ | 380/30 |
| 6,564,261 B1 | * | 5/2003 | Gudjonsson et al. ....... | 709/227 |
| 6,957,199 B1 | * | 10/2005 | Fisher ......................... | 705/78 |
| 6,983,379 B1 | * | 1/2006 | Spalink et al. ............... | 705/10 |

FOREIGN PATENT DOCUMENTS

| | | |
|---|---|---|
| WO | WO 00/01108 | 1/2000 |
| WO | WO 00/51049 | 8/2000 |
| WO | WO 00/69140 | 11/2000 |
| WO | WO 01/33522 A1 | 5/2001 |
| WO | WO 01/45350 A2 | 6/2001 |
| WO | WO 01/59545 A2 | 8/2001 |

\* cited by examiner

*Primary Examiner*—Emmanuel L. Moise
*Assistant Examiner*—Paul Callahan
(74) *Attorney, Agent, or Firm*—Scully, Scott, Murphy & Presser, P.C.; William H. Steinberg, Esq.

(57) ABSTRACT

A method and apparatus for communication via a computer network (102) including registering a plurality of users (206, 222, 224) with a trusted body (110, 210). The trusted body (110, 210) verifies the identity of each user (206, 222, 224) and generates a random identifier (216) for each user (206, 222, 224). A plurality of users (206, 222, 224) can enter into a dialogue with the other users by means of messages sent over the computer network (102) via the trusted body (110, 210). A user (206, 222, 224) remains anonymous through use of its random identifier (216) until such time as the user (206, 222, 224) reveals its true identity. Due to the registration of the users (206, 222, 224) with the trusted body (110, 210) a means of non-repudiation of the dialogue by the users (206, 222, 224) is provided.

14 Claims, 5 Drawing Sheets

METHOD AND SYSTEM FOR COMMUNICATION VIA A COMPUTER NETWORK

FIELD OF THE INVENTION

This invention relates to a method and system for communication via a computer network. In particular, the invention relates to communication between at least two parties in a dialogue.

BACKGROUND OF THE INVENTION

The advent of the Internet has resulted in the development of new forms of communication. One example is a "chat room" which is a forum in which users can enter into dialogue with other users in real time. The users can keep their true identities hidden by adopting invented names. Anyone can enter into a dialogue in such a forum and users can make statements or express opinions which are known to the user to be untrue. Therefore, such forums may be useful for informal dialogues, but they are not suitable for dialogues in which the users should be accountable for the content of their submissions, for example, business negotiations.

Business negotiations may take place in traditional, non-Internet, environments via an intermediary in order to maintain the anonymity of a party. For example, if a first corporation wishes to purchase a second corporation, the identity of the first corporation may be kept secret during initial discussions carried out via a third party.

It is an aim of the present invention to provide a method and system for facilitating dialogue between two or more parties via a computer network, such as the Internet, which provides anonymity, accountability and provides an agreed set of rules for the dialogue.

This has the advantage that it enables two or more parties that may or may not have an existing relationship to participate in dialogue, for example, negotiations, without initially revealing their identity or intent to the other parties in the dialogue.

SUMMARY OF THE INVENTION

According to a first aspect of the present invention there is provided a method for communication via a computer network, the method comprising: registering a plurality of users with a trusted body; verifying the identity of each user; generating a random identifier for each user, the trusted body keeping a confidential record of the relation between the identity of a user and the random identifier; wherein a user can enter into a dialogue with one or more other users by means of messages sent over the computer network and via the trusted body, and a user remains anonymous through use of its random identifier until such time as the user reveals its identity to one or more of the other users; and wherein the method includes recording the dialogue and using the recorded dialogue together with the confidential record of the relation between the identity of a user and the random identifier to provide a means of non-repudiation of the dialogue by users.

The step of verifying the identity of a user may be carried out by validating a public key cryptography certificate for a user.

The trusted body may verify the suitability of a user to participate in a dialogue.

Preferably, the trusted body verifies the authenticity of a message sent by a user. The trusted body may use public key cryptography to authenticate messages sent by a user. The trusted body may time-stamp all messages from users when recording the dialogue formed by the messages between users. The dialogue may be in real time.

The trusted body may prescribe a set of rules to be followed by the users.

The users may be any of individuals, corporate bodies, organisations, automated machines or software applications. If the users are automated machines or software applications they are acting on behalf of and with the authority of an individual or corporate body who carries the responsibility for the machines actions.

A message from a user may be sent to an input queue to ensure the correct order of the messages handled by the trusted body.

Messages may include attachments in the form of documents to be discussed in the dialogue between users.

The attachments may be watermarked.

According to a second aspect of the present invention there is provided a system for communication via a computer network comprising: a plurality of distributed computer systems connected by a computer network, a trusted body connected to the computer network, the trusted body including: means for verifying the identity of a user of a computer system and means for generating a random identifier for a user, a record confidential to the trusted body of the relation between the identities of the users and the random identifiers; means for two or more users to perform a dialogue via the trusted body, wherein a user remains anonymous through use of its random identifier until such time as the user reveals its identity to one or more of the other users, and wherein the system includes a record of the dialogue which together with the confidential record of the relation between the identities of the users and the random identifiers provides a means of non-repudiation of the dialogue by users.

The computer network may be the Internet and the trusted body may be a network service provider, for example and Internet or intranet service provider.

Each user may have a graphical user interface showing the dialogue and status of the other users. The graphical user interface may include a means for viewing a document sent by a user as an attachment to a message of the dialogue.

According to a third aspect of the present invention there is provided a computer program product stored on a computer readable storage medium, comprising computer readable program code means for performing the steps of: registering a plurality of users with a trusted body; verifying the identity of each user; generating a random identifier for each user, the trusted body keeping a confidential record of the relation between the identity of a user and the random identifier; wherein a user can enter into a dialogue with one or more other users by means of messages sent over the computer network and via the trusted body, and a user remains anonymous through use of its random identifier until such time as the user reveals its identity to one or more of the other users; and wherein the method includes recording the dialogue and using the recorded dialogue together with the confidential record of the relation between the identity of a user and the random identifier to provide a means of non-repudiation of the dialogue by users.

The concept of the described method and system can be thought of as a virtual meeting. The virtual meeting is held in a virtual building. There are many entrances to the building for users which are gateways which can be made to appear at anytime and in any location in the world. Users can go through a gateway without being seen by anyone else. When a user enters a gateway, he reaches the reception on floor one and is serviced in isolation. A user does not see any other users who enter. When a user registers and his true identity has been checked, he is given a random identifier which is a form of mask which can be used in a given meeting taking place in one of the virtual meeting rooms.

BRIEF DESCRIPTION OF THE DRAWINGS

A preferred embodiment of the invention will now be described in detail by way of example only with reference to the following drawings.

DETAILED DESCRIPTION

Figure 1:
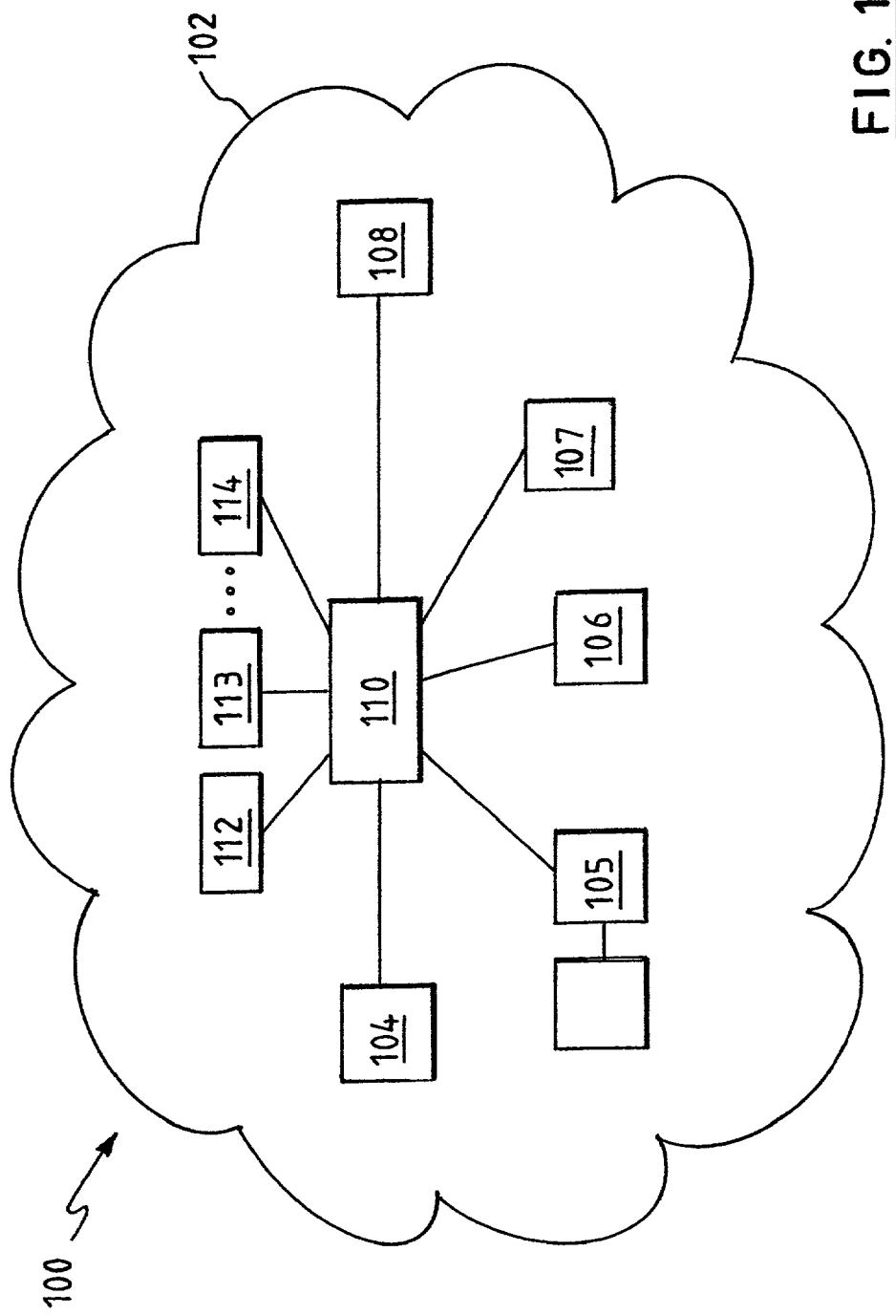
FIG. 1 is a diagram of a computer system in accordance with the present invention.

Referring to FIG. 1, a system 100 for communication via a computer network 102 is provided. The system 100 includes a plurality of distributed computer systems 104-108. The distributed computer systems 104-108, may be individual computers or a network of computers 105. The computer network 102 connects the distributed computer systems 104-108 and may be the Internet, an intranet or another form of computer network. The distributed computer systems 104-108 may be physically located globally in different countries, or all within a single building. There is no restriction on the form of the distributed computer systems to which the described embodiment may apply.

If the embodiment of the Internet is considered, the distributed computer systems 104-108 can be any users of the Internet. The term "computer system" is not limited to a specific form of apparatus. Any apparatus capable of processing information and connecting to a network is included in the definition, including, for example, WAP mobile telecommunication devices.

The system 100 of FIG. 1 has a trusted body 110 which acts as the focal point for all communication. The trusted body 110 is an electronic component which may have human intervention in the form of an active software application with a function. The trusted body 110 may be provided by an Internet service provider.

The trusted body 110 governs access by the distributed computer systems 104-108 to one or more virtual meeting rooms 112-114. The virtual meeting rooms 112-114 are provided on a network server computer.

Each operator of one of the distributed computer systems 104-108 is referred to as a "user". The users may be individuals, a group of individuals, corporations, organisations, automated machines, etc. If the users are automated machines or software applications they are acting on behalf of and with the authority of an individual or corporate body who carries the responsibility for the machines actions. In the described embodiment, users of the computer systems 104-108 are referred to. The distributed computer systems 104-108 have client application software which provides an interface to each user. The form of the client application is described later.

The client side processing includes information which is captured, signed and exchanged and this is implemented by a client side application and computing device. The client application may also use digital certificates to sign and encrypt transmitted information.

The information and components of the client application must be kept confidential in order to protect components such as private keys, dialogue to date and cross-references to users of random identities.

Each user registers with the trusted body 110. The registration procedure has the purpose of establishing to the trusted body 110 the true identity of the user. Once the identity of the user has been verified and established as genuine by the provision of some form of evidence from the user, the trusted body 110 allocates a unique random identifier to the user. The random identifier represents the identity of the user for the purposes of a dialogue session with other users. The true identity of a user is confidential to the user and the trusted body and it is up to the user when to disclose its true identity to all or a subset of the other users.

In the described embodiment, the registration procedure of a user with the trusted body is carried out by the use of public key encryption. Public key encryption is an asymmetric scheme that uses a pair of keys for encryption. The public key is released to the public who can use it for encrypting data. A public key has a corresponding private key which decrypts the data. The private key is kept secret by the user so that only the user can decrypt a message encrypted with the public key. For digital signatures the process is reversed: the sender uses the secret private key to create a unique electronic number that can be read by anyone possessing the corresponding public key, which verifies that the message is truly from the sender.

In public key cryptography, digital certificates are used to prevent a user from broadcasting a public key and pretending to be another user. A digital certificate consists of a public key plus a user ID of the key owner, with the whole block signed by a trusted third party.

The third party is a certificate authority (CA) that is trusted by the user community. To register for a certificate, a user must register with a registration authority (RA) which collects information to verify the identity of the user and passes this to the CA. The digital certificate is then published. Anyone needing 15. this user's public key can obtain the certificate and verify that it is valid by way of the attached trusted signature of the CA.

In the described embodiment, the trusted body 110 acts as a registration authority, and central point of contact for all dialogue. The trusted body 110 has a public and private key pair which it uses to sign all its communications. A user, "Member 1", generates a public and private key pair specifically for a dialogue session (meeting) and sends the public key to the trusted body 110. The public key is received and additional registration carried out by verifying the identity of Member 1 and any authorisation to act on behalf of other parties or as a representative of an organisation. Each user exchanges information with the trusted body that ensures that each user is who it says it is and that any generated dialogue is from that user.

One form of verifying the identity of a user could be by means of a private/public key pair that the user has which is registered with an outside registration authority (RA). For example, a user generates a public and private key pair specifically for a dialogue session and sends the public key to the trusted body 110 with the public key signed using the user's existing private key which is registered with a RA. The trusted body can find the corresponding public key and will also have the verification from the RA that the user is a given party.

Other forms of verifying the identity of a user can be made using more traditional forms of identification, by means of post, telephone etc.

The trusted body generates a unique random identifier for Member 1 and also generates a certificate for the random identifier which the trusted body stores in a public registry. The trusted body can then confirm by means of the public certificate that it can prove the identity of the user using the random identifier, if required, and can also confirm that the user is known and meets any entry requirements.

The unique random identifier for Member 1 is sent to the user signed by the trusted party. The user signs a return message to the trusted party accepting the certificate.

Referring again to FIG. 1, the users can enter a virtual meeting room 112-114 to participate in a dialogue with other users each using a random identifier so as to keep the identify of the users hidden. The trusted body 110 issues the random identifier once it is satisfied of the real identity of the user (and proof that they have accepted the identifier) and the trusted body keeps a secure record of the real identities of the users. The random identifier lasts for the duration of a dialogue or "meeting" and is unique to that dialogue. If a user is simultaneously participating in two dialogues in two different virtual meeting rooms 112-114, the user will have two different random identifiers.

All users have a number of meeting rules and these are matched against all users participating in the meeting. Such rules include rules for identifying users to colleagues, if they agree to do so.

A meeting consists of a real time dialogue held in a virtual meeting room 112-114. The users participating in a dialogue can log off the network 102 during the dialogue and return to it at a later time. The users must be logged into the network 102 to send or receive a contribution to the dialogue. The dialogue may be long-running. The dialogue is recorded against users and in time sequence. The virtual meeting room 112-114 can have facilities for sharing information to either the entire user community or a restricted set. Information sharing and voting can also take place in real time.

At any point in time, private messages may be sent between a subset of the users participating in a dialogue, for example two or more of the users, and if mutual agreement is reached between the users, they can jointly reveal their identifies to each other but not necessarily to all the other participants of the dialogue.

Users can permanently withdraw from a meeting at any time but loose the right to see the outcome of the meeting and cannot re-enter under another random identifier. Users can also temporarily withdraw from a meeting and they loose the right to know what dialogue occurred in the meeting during their absence. For example, the users participating in a meeting may ask one user to leave temporarily while they discuss a point regarding that user. When the user returns to the meeting they are not informed of the discussion that took place in their absence. However, if it is agree by the other users, a user can be informed of dialogue that took place in that user's absence from the meeting.

A user can disconnect from the network 102 whilst still being permanently in the meeting. The connection to the network 102 by the participating users does not need to be continuous. The temporary or permanent withdrawal from a meeting is independent of the connection to the network.

Once the meeting has completed, the user community may decide to reveal all identities, which will in turn provide evidence of who generated dialogue. This evidence cannot be repudiated. Therefore, once the meeting starts, the users are accountable for what they say, so that when one or more users choose to reveal their identities, they have to be accountable for past dialogue.

Figure 2:
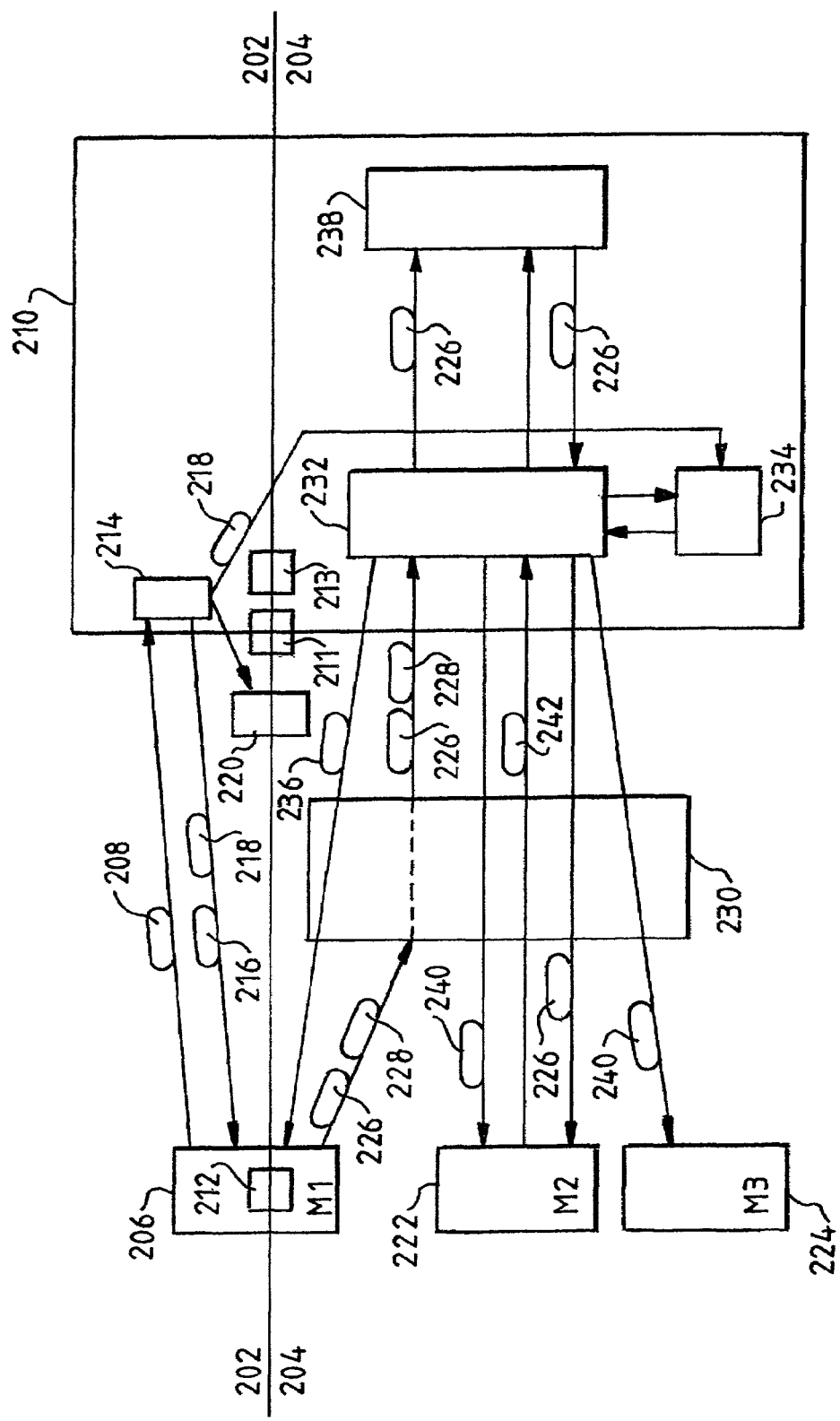
FIG. 2 is a diagram of the implementation of the method and system in accordance with the present invention.

Referring to FIG. 2, an embodiment of the method and system is shown. FIG. 2 is divided into two sections, a first section 202 shows registration of a user and a second section 204 shows dialogue between users. The trusted body 210 is involved in both the registration and dialogue sections 202, 204.

A first user 206 would like to register to take part in a dialogue which the trusted body 210 is governing.

The registration procedure takes place as described previously by the first user 206 generating a key pair specifically for the dialogue and sending a public key 208 corresponding to the private key 212 of the generated key pair to the trusted body 210. The trusted body 210 receives the public key 208 and carries out the registration 214 of the first user 206.

The trusted body 210 has a public and private key pair 211 and 213 respectively and the trusted body signs communications with its private key 213. It may send its public key to a new user 206.

The registration 214 includes the generation of a random identifier 216 for the first user 206 and a certificate 218 for the random identifier 216. The certificate 218 confirms the that the identity is known to the trusted body and can be proved at a later date (provable by previous RA Process or other verification means provided) and is created using the private key 213 of the trusted body.

The random identifier 216 and the certificate 218 are sent from the trusted body 210 to the first user 206. The certificate 218 is stored by the trusted body 210 in a public register 220 The random identifier 216 for the first user 206 is shown in FIG. 2 as "M1". The registration 214 is time-stamped to indicate the time of the issue of the random identifier 216 for the first user 206.

The trusted body 210 also sends the details of the true identity and the corresponding random identifier to a private register 234 which is only accessible by the trusted body 210. The private register 234 is updated when a new user is registered. This is the only place in which there is a cross-reference between all the true identities and the corresponding random identifiers.

The first user 206 would now like to participate in a dialogue in a virtual meeting with other second and third users 222 and 224 who have been registered with random identifiers 216 of M2 and M3. This is shown in the dialogue section 204 of FIG. 2.

The first user 206 would like to add some textual dialogue 226 to the dialogue to both the second and third users 222, 224. The first user 206 creates the message 226 and specifies a distribution list 228 which, in this case, specifies that the message 226 is to be made available to all those users in the meeting, namely the second and third users 222, 224 referred to by their random identifiers of M2 and M3.

The first user 206 signs the message 226 and the distribution list 228 with its random identifier using its private key 212 of M1 and sends the signed message 226 and distribution list 228 to the trusted body 210. The message 226 and distribution list 228 are put in an input queue 230 which ensures that messages are handled by the trusted body 210 in the order in which they were sent by any of the users 206, 222, 224 and establishes the order of the dialogue. The messages are encrypted and secured for receipt by the trusted body 210 only by using 210's public key 211.

When the message 226 and distribution list 228 are at the head of the input queue 230, they are sent by the input queue 230 to a controller 232 which is part of the trusted body 210. The controller 232 decrypts and reads the message 226 and the distribution list 228 and authenticates them. This is done by referring to a directory of the random identifiers and certificates held by the trusted body 210 which may be the private register 234 or the public register 220.

The entire message 226 and signings are time-stamped by the controller 232 and signed by the trusted body 210 using the private key 213. The controller 232 returns an acknowledgement 236 signed by the trusted body 210 to the first user 206 as proof of sending of the message 226 by the first user 206.

The message 226 is also sent to a record 238. The record 238 is an audit of all the dialogue with access criteria and in order of time. The record 238 is the master record of all the dialogue in a meeting. The access criteria only allow access to messages within the dialogue to users named in a distribution list for that message and present in the meeting at the time. The record 238 is encrypted for the trusted body 210 only to access.

There is a separate data store in the record 238 and in the private register 234 for each dialogue session being managed by the trusted body 210.

The controller 232 also sends a notification 240 to the second and third users 222, 224 who where named on the distribution list 228 that the record 238 contains new content. As an alternative embodiment, the controller 232 may send the message directly to the second and third users 222, 224.

The dialogue is time-stamped by the trusted body 210. This is important as the users participating in a dialogue may change. When a message is sent by a user with a distribution list, the list will identify users that the message is intended for at the time the message was sent. If the message is addressed to all users participating in the dialogue, it is important that the message is only accessible by those users still participating in the dialogue at the time the message was sent. A user may have left the dialogue and is therefore no longer entitled to see the message even if they re-enter later. A user may, however, choose to send a message to a user who has temporarily left the dialogue.

A level of protection is needed so that anyone just entering the meeting does not pick a message up as a result of the timing of the entry, for example, a user may enter the room 1 second before another user sends a text message.

The second user 222 would like to make a request to the trusted body 210. Requests can be, for example, one of the following:
To enter a dialogue;
To leave a dialogue;
To have revealed the true identity to the users;
To see the dialogue between specified times;
To start a sub-dialogue;
To execute a given rule.

In this embodiment, the second user 222 would like to read the message 226 sent by the first user 206 which is in the record 238. The second user 222 creates the request 242, signs the request 242 and sends the signed request 242 to the trusted body 210 and the request 242 is manipulated by the controller 232 via the message queue 230.

All information passes through the message queue 230 and is encrypted and targeted at either the trusted body 210 or individual users 206, 222, 224.

The trusted body 210 authenticates the request 242 by referring to the directory 234. The trusted body 210 then reads the message 226 from the record 238 and returns a response to the second user 222 subject to access times and rights with the message 226 signed by the trusted body 210. The second user 222 receives response and stores the message 226. The message 226 is signed by the trusted body 210 using the private key 213.

If two or more messages are received at the input queue 230 within a predetermined time interval, for example 10 seconds, they may be treated as being received at the same time and this will be indicated in the dialogue record 238. This will indicate that the messages were sent by the relevant users without the users having seen the simultaneously sent message. If a user enters a dialogue within a predetermined time interval since a message was sent by a user, the entering user will not receive the message as the sending user was not aware that the new user had entered. A user must have been in a dialogue longer than the predetermined time interval before the user receives messages.

If a user is still participating in a dialogue, but has not been available to receive messages for a given time, for example if the user is logged off the network, he may request a copy of the messages sent in the time he has not been available.

A dialogue may carry on over a significant length of time, for example weeks or months, with users accessing or logging on to the dialogue intermittently.

Figure 3:
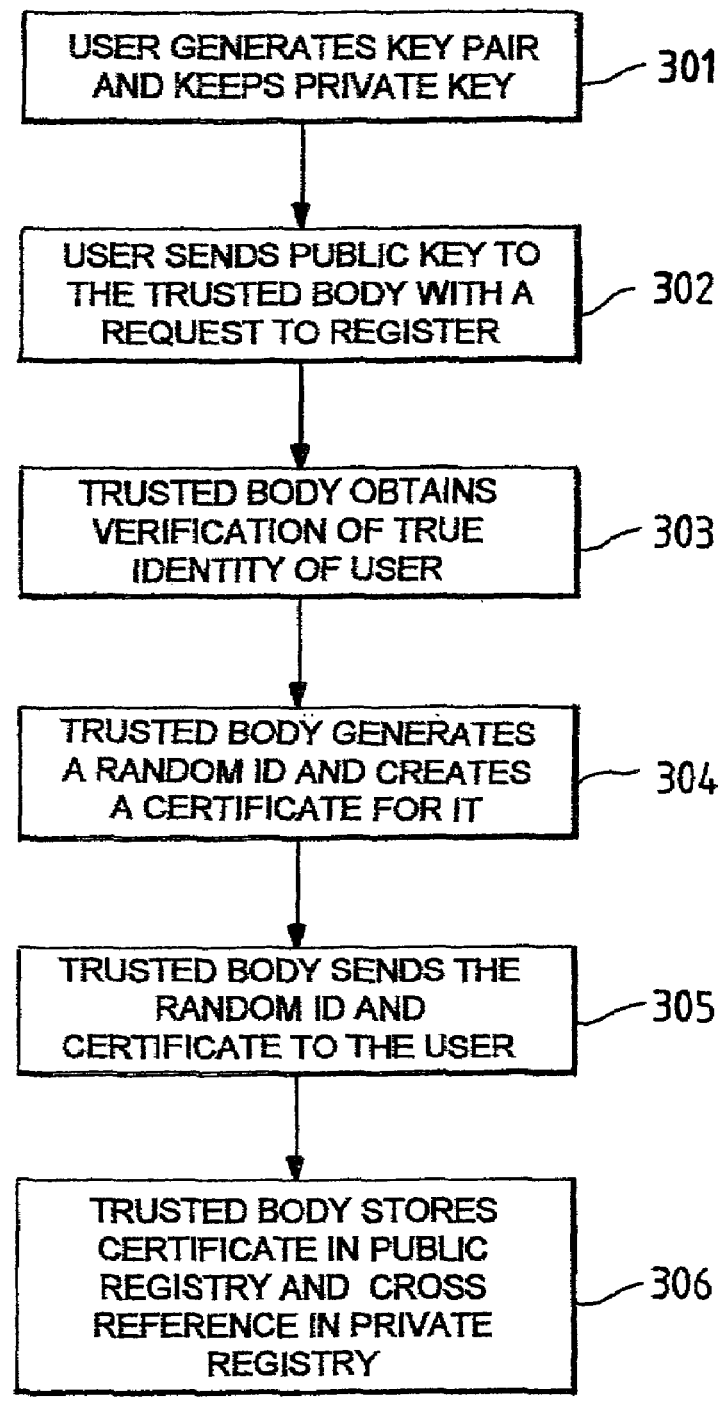
FIG. 3 is a flow diagram of the registration procedure in accordance with the present invention.

FIG. 3 shows a flow diagram of the registration procedure of a user with the trusted body. At step 301, a user generates a key pair for a dialogue session and keeps the private key of the key pair. At step 302, the user sends the public key of the key pair to the trusted body with a request to register. At step 303, the trusted body obtains verification of the true identity of the user. The trusted body at step 304 generates a random identity for the user and creates a certificate for the user. At step 305, the trusted body sends the certificate to the user. At step 306, the trusted body stores the certificate in a public registry with a cross-reference to a private registry.

The process of sending a contribution to the dialogue includes the following steps:
1. A user creates a text message and identifies other users who are to receive it (the distribution list);
2. The message and text signed with the private key of the user;
3. The message is encrypted using the public key of the trusted body and sent to the trusted body;
4. The message is received, unencrypted using the trusted body's private key, stored and acknowledged by the trusted body;
5. A notification and or message is sent to the appropriate recipients.

Figure 4:
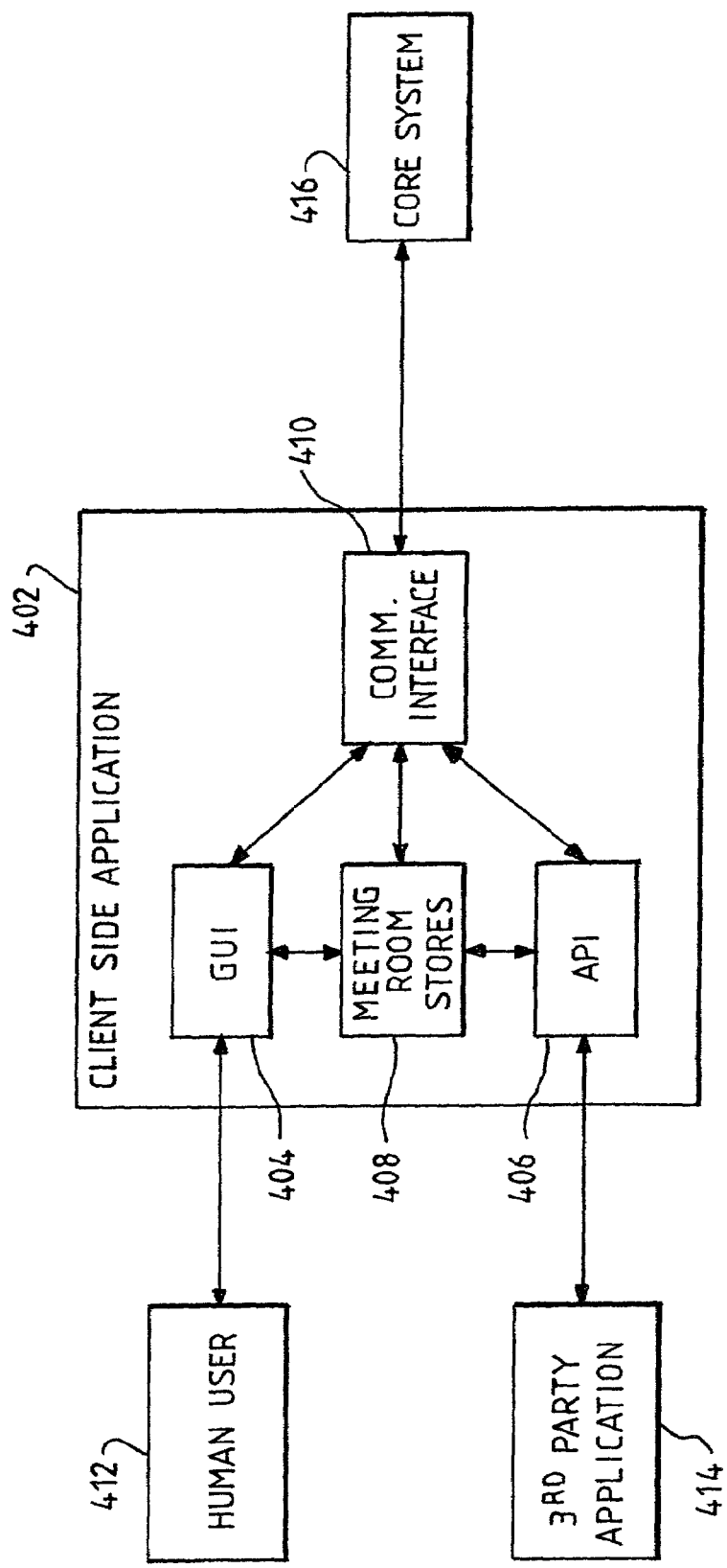
FIG. 4 is a block diagram of part of a computer system in accordance with the present invention.

Referring to FIG. 4, a diagram of a client application is provided. A client application is required in order to support the participation of a user in a dialogue. A client application stores data involved in the dialogue and provides the necessary encryption technology.

A user system is shown in FIG. 4. The system provides support for users in the form human users 412. A client application 402 is provided with a graphical user interface 404 for a human user 412 of the system.

The client application 402 is also accessed by traditional computer applications 414 that will act on behalf of a human user and make use of and instruct the client application 402 to access a dialogue session. The client application 402 has an application program interface 406 for interaction with the third party application 414.

The client application 402 has local data storage 408 that stores data held for one or more meetings in which the user 412 is participating. All stored data is locally encrypted to protect it from unauthorised external access. The data storage 408 for each meeting can include a dialogue store including attachments, a cross-relationship table for the users participating in the meeting, a message preparation area and a key pair storage area.

The client application 402 has a communication interface 410 which is responsible for access to the core system in the form of the trusted body via an input queue 416. The communication interface 410 manages communications and verification, etc.

The client application 402 itself is a secure system. A user 412 or application 414 must provide a user ID and password before access to the client application 402 is provided. This is due to the fact that the client application 402 may include private keys, although these may be held off device in the form of smart cards, etc. Once a user has verified its identity to the client application 402, the system will use the private keys on its behalf. If this security is to be very strong, additional public key infrastructure can be used.

As an example, when a user 412 wishes to send a message as part of a dialogue, the user system 400 takes the following steps.

1. The user 412 identifies itself to the client application 402. If a third party application 414 is issuing a command to the client application 402 it must identify itself for every command.
2. The client application 402 presents the dialogue on the graphical user interface 404.
3. The client application 402 polls the core system for any updates or dialogue text which has not yet been received by the client application 402.
4. On creation of a message, the client application 402 provides information on current users participating in the dialogue.
5. The client application 402 creates a message, signs the message and distribution list and confirms acknowledgement of the message.

Figure 5:
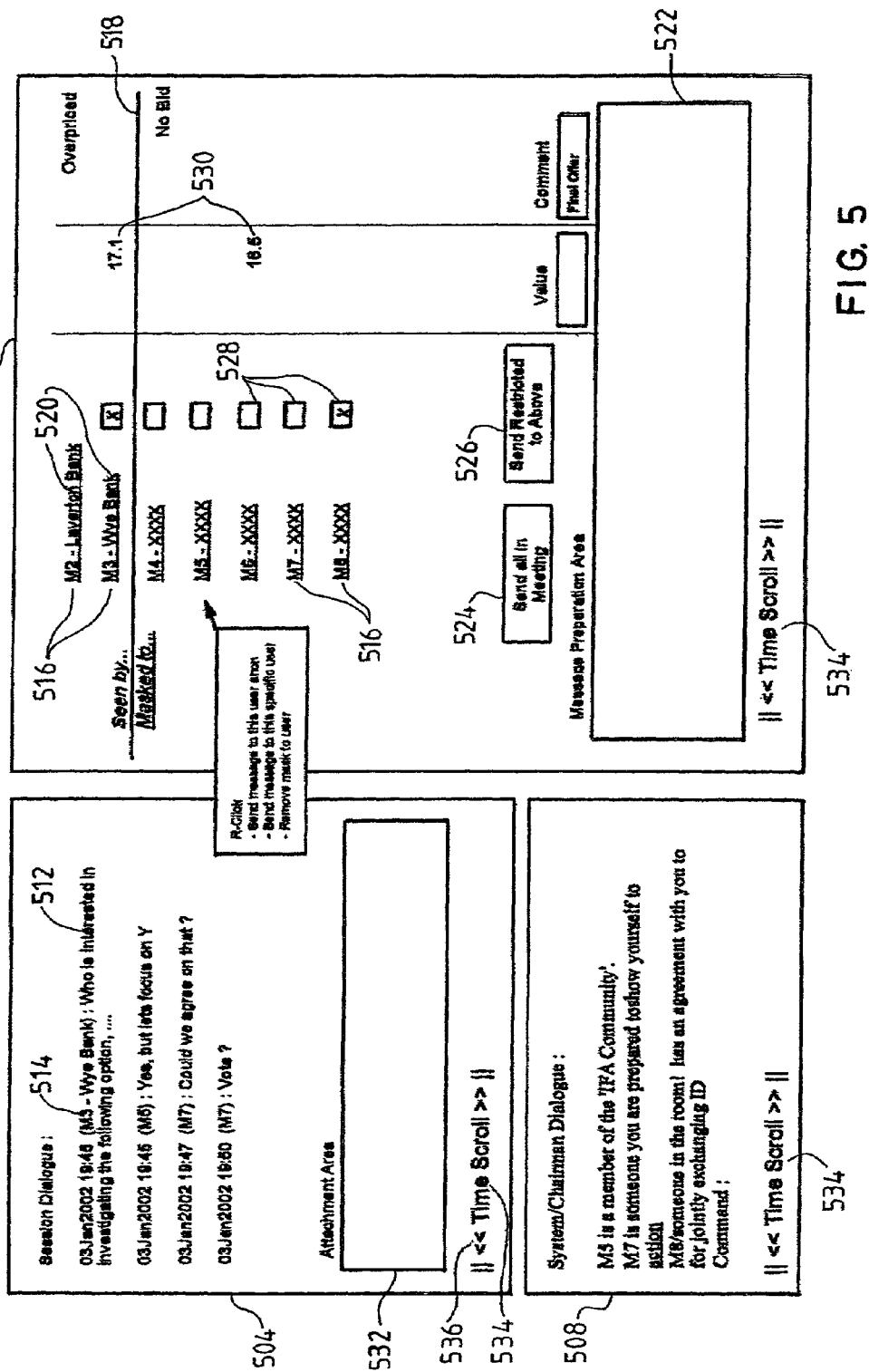
FIG. 5 is a representation of a graphical user interface for the method and system in accordance with the present invention.

Referring now to FIG. 5 an embodiment of a graphical user interface as a user would see it on his computer is shown. The user interface 500 is provided for a particular dialogue or "meeting" in which the user is participating. It will be appreciated that the user interface can take many forms and the form shown in FIG. 5 is an example of one of the possible forms.

The user interface 500 has a title 502 for the dialogue and three boxes 504, 506, 508. The first box 504 shown on the left contains the dialogue stream with time for a particular session. A sequence of messages 512 in the dialogue is given with date and time of each message 512 together with the random identifier 514 (or real identity, if known) of the user sending the message 512. The dialogue shown in box 504 is for the particular user of the interface and only contains the messages 512 in which this user was identified in the distribution list of the message 512 when it was sent by its originator.

The first box 504 may include a virtual meeting table in the form of an attachment area 532 on which documents can be placed for viewing by the users. Such documents can be sent with messages in the dialogue as attachments and may be text, image or other form of document. The users may be able to take copies of the documents.

Documents which are submitted by a user as an attachment to a message in a dialogue can be signed with the random identifier certificate of the sender so that document cannot be tampered with or repudiated.

Such documents can also be watermarked to ensure that they are not distributed outside the users, without traceability. A watermark can be checked for correlation to a random identifier on submission of the document. Discrepancies between the sender and the watermark are highlighted by the trusted body and informed to the sender. Functionality is available in the trusted body for the random identifier to be correlated with a watermark. A watermark can also identify the random identifier of the intended recipient of a document.

The messages need not be written messages. The dialogue could be in the form of speech depersonalised into electronic sounds.

The second box 506 in the user interface 500 contains status information relating to users in the dialogue session and a message preparation area. The box 506 has a horizontal line 518 helping to distinguish which other users know the identity of the user of the interface. Users above the line 518 know the true identity of the user of the interface and those below do not.

In the example shown, user M1 is the user of the interface and has mutually revealed his identity to two of the other users, M2 and M3. Hence, users M2 and M3 are placed above the line 518 and their true identities 520 are given together with their random identities 516. All the other users, M4-M8, are still only known by their random identifiers 516. It is possible that one of the users above the line 518 is anonymous.

Within the 506 box users can prepare messages in the message preparation area 522. The messages can include attachments, if required. Once the user is satisfied with the form of the message to be sent, he can send it by selecting either the "send to all in meeting" selector 524 or a selector 526 to send to a restricted set of the users. The users are selected for the restricted set by checking boxes 528.

The second box 506 also shows how a possible voting and information sharing scheme may work where users can enter a value 530 and comment which will then be shown in the other users' interfaces.

Finally, the third box 508 is an area where the user can interact with the trusted body to reveal themselves or enter commands.

Each of the boxes 504, 506, 508 has a time scroll 534 which can be activated to move the information shown in the relevant box backwards or forwards in time. For example, a user of the interface 500 may wish to review messages 512 in the dialogue which were sent the previous day in which case the time scroll 534 in box 504 will be activated by selecting the left-pointing double arrow 536.

If the time scroll 534 is used once a user's true identity has been revealed, as the displayed time changes, by scrolling using the time scroll 534 in box 504, the true identity can be displayed against past comments together with an indication of whether or not the true identity was known to the user of the interface at the time of a displayed message.

Users can obtain details of meetings to take place by many different means. As examples, the subjects of future meeting may be posted on a notice-board or sent to potentially interested parties. Users may nominate other users and introduce them to a meeting, etc.

The method described herein is typically implemented as a computer program product, comprising a set of program instructions for controlling a computer or similar device.

These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. A method for communication via a computer network, the method comprising:
   registering a plurality of users with a trusted body, including the steps of each of the users generating a first public/private key pair for a specific dialogue session, and sending the public key of the public/private key pair to the trusted body;
   said trusted body verifying the identity of each user by using said public key;
   said trusted body generating a random identifier for each user, and keeping a confidential record of the relation between the identity of each user and the random identifier for the user;
   one of the users entering into a dialogue with one or more other users by sending messages over the computer network and through the trusted body to said one or more other users, wherein said one of the users remains anonymous through use of its random identifier until such time as the user reveals its identity to one or more of the other users; and
   wherein the trusted body has a second public/private key pair, and the user encrypts said messages using the public key of said second public/private key pair, and the method includes said trusted body recording the dialogue by recording the encrypted messages, and using the recorded dialogue together with the confidential record of the relation between the identity of a user and the random identifier to provide a means of non-repudiation of the dialogue by users.

2. A method as claimed in claim 1, wherein the step of verifying the identity of a user is carried out by validating a public key cryptography certificate for a user.

3. A method as claimed in claim 1, wherein the trusted body verifies the suitability of a user to participate in a dialogue.

4. A method as claimed in claim 1, wherein the trusted body verifies the authenticity of a message sent by a user.

5. A method as claimed in claim 4, wherein the trusted body uses public key cryptography to authenticate messages sent by a user.

6. A method as claimed in claim 1, wherein the trusted body time-stamps all messages from users when recording the dialogue formed by the messages between users.

7. A method as claimed in claim 1, wherein the dialogue is in real time.

8. A method as claimed in claim 1, wherein the trusted body prescribes a set of rules to be followed by the users.

9. A method as claimed in claim 1, wherein, the users can be any of individuals, corporate bodies, organizations, automated machines or software applications.

10. A method as claimed in claim 1, wherein a message from a user is sent to an input queue to ensure the correct order of the messages handled by the trusted body.

11. A method as claimed in claim 1, wherein messages can include attachments in the form of documents to be discussed in the dialogue between users.

12. A method as claimed in claim 11, wherein the attachments are signed or watermarked.

13. A method according to claim 1, wherein the trusted body maintains the private key of said private key/public key pair, and the step of using said private key to decrypt the encrypted messages. includes a means for viewing a document sent by a user as an attachment to a message of the dialogue.

14. A method according to claim 1, wherein:
   the user has a third public/private key pair;
   the steps of sending the public key of the public/private key pair to the trusted body includes the step of the user signing the first public key by using the third private key and sending the signed first public key to the trusted body;
   comprising the further steps of:
   the trusted body verifying the identify of the user by obtaining the third public key and using the third public key to verify the signature of the user on the first public key;
   the trusted body, after verifying the identify of the user, signing the random identifier and sending the signed random identifier to the user; and
   the user signing the message with the random identifier.

* * * * *